Dec. 2, 1941.    W. O. HORNE    2,264,378
POT TYPE BURNER
Filed April 19, 1939
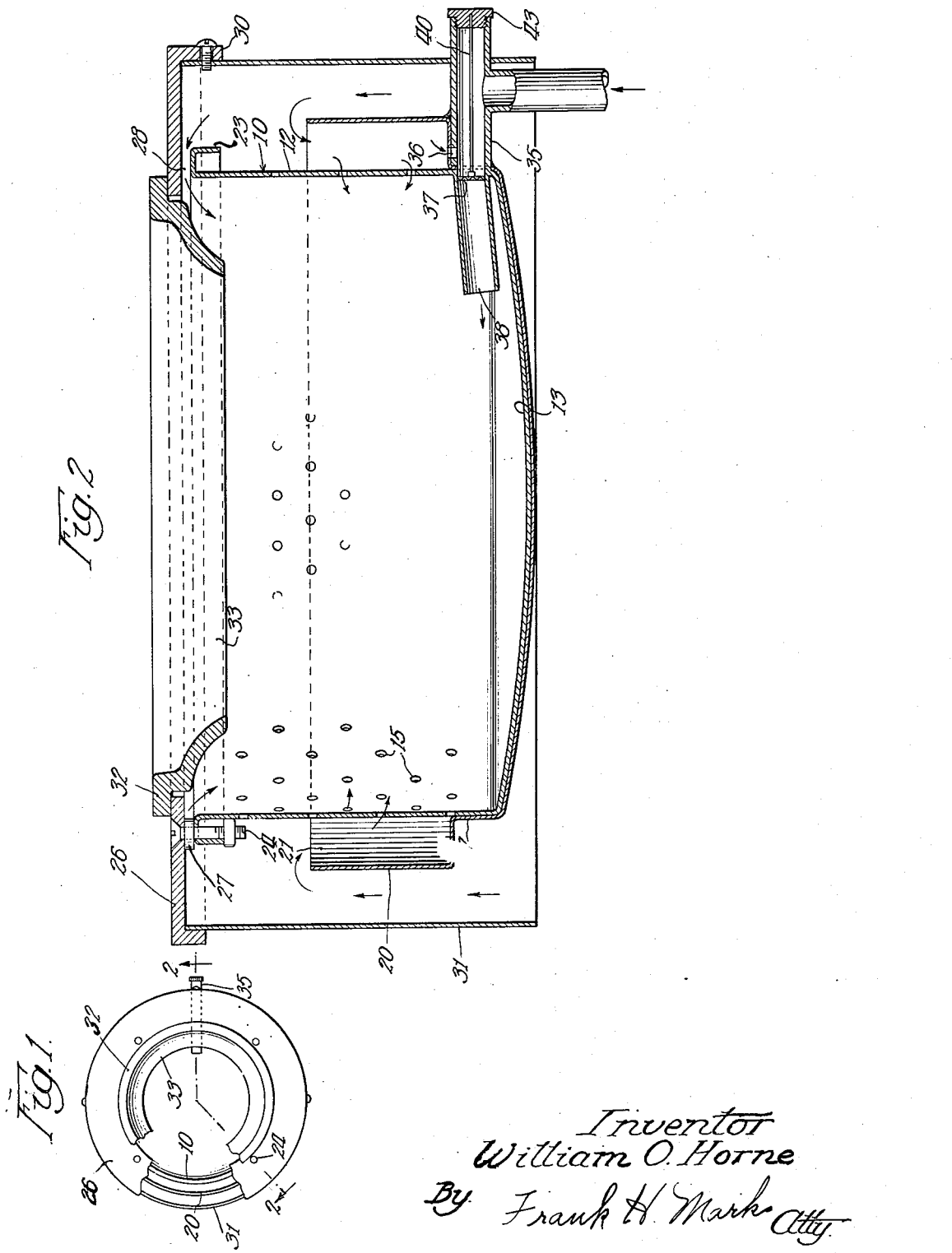
Inventor
William O. Horne
By Frank H. Mark Atty.

Patented Dec. 2, 1941

2,264,378

UNITED STATES PATENT OFFICE 2,264,378

POT TYPE BURNER

William O. Horne, Chicago, Ill.

Application April 19, 1939, Serial No. 268,776

5 Claims. (Cl. 158—91)

My invention relates to burners of the pot type which are especially suitable for heating purposes in connection with various types of stoves, furnaces, and the like, and are especially adapted for the consumption of liquid fuel of relatively high gravity.

Pot burners of this general type have been well known for many years, and many advantages thereof have been recognized, such as, simplicity of construction, economy of operation, etc. However, burners of the pot type have been subject to serious criticisms. For one thing, they have been characterized by a lack of flexibility with regard to high and low heat demands, most burners of this type lacking the capacity for substantial "turn down," whereby an efficient low flame could be maintained. There have been many other disadvantages which need not here be discussed in detail.

A particular object of my invention is to provide a burner of the pot type which is so designed that it will produce a large amount of heat as compared to the comparatively small size of the burner; which will permit a very low pilot flame, thus improving the economy of operation when heat is not demanded; which will permit rapid change from low to high fire; which will operate satisfactorily with relatively low natural draft; which will have a high degree of flexibility and adaptability, particularly with respect to turn down ratio.

Another object is to provide a burner of the type referred to which will be safe in operation, simple in construction, easy and economical to manufacture, rugged, and, in general, entirely satisfactory for the purposes desired.

Various other objects and advantages will become apparent as the description proceeds.

Referring now to the drawing forming a part of this specification and illustrating a preferred embodiment of my invention:

Fig. 1 is a top plan view of one embodiment of my invention, with parts broken away to show the construction more clearly; and Fig. 2 is a vertical sectional view on an enlarged scale taken substantially along the line 2—2 of Fig. 1.

The numeral 10 indicates a main bowl or pot having a cylindrical side wall 12 and an inwardly concave bottom wall 13. The side wall is provided with successive rows of perforations 15 beginning immediately above the normal fuel level in the bottom of the bowl and extending nearly to the top thereof. The main bowl 10 rests in an imperforate outer or secondary bowl 17, the upper portion 20 of which is spaced outwardly from the side wall 12 of the main bowl to define an annular space 21 therebetween, said space 21 being open at the top for the passage of air.

The side wall 12 of the main bowl is bent outwardly to form an overhanging rim or flange 23 to which is attached, as by screws 24 or the like, an annular supporting member 26. It should be noted that the annulus 26 is spaced from the top of the rim of the main bowl 12 by means of spacing members 27 disposed on the screws 24, thus defining an annular space 28. Depending perforated ears 30 may be formed on the annulus 26 whereby the burner may be secured within any suitable combustion apparatus. In certain applications I use a skirt 31 which is attached to the ears 30 by screws or the like.

Loosely seated on the inner peripheral portion of the annulus 26 is a ring 32 having a downwardly and inwardly extending portion 33. The flange 33 is preferably curved downwardly, i. e., concave on its lower surface, so as to impart a downward and inward swirl to the air admitted under ring 32.

A fuel conduit 35 extends through the bowls 10 and 17 and well into the interior of the inner bowl 10. The portion of this conduit within the bowl 10 preferably slopes downwardly sufficient to permit complete drainage of fuel, the preferred slope approximately 5 to 10 degrees. The conduit within the combustion chamber is of reduced thickness, whereby any residue of oil will quickly burn out. This conduit 35 is preferably provided with an aperture 36 in the upper portion thereof registering with the annular chamber 21, whereby primary air may be drawn into the current of oil which is being fed into the burner. A foraminous screen 37 is positioned within the conduit 35 inwardly of the aperture 36 and spaced from the discharge opening 38 of the conduit to prevent the flashing back of flame into the conduit. I may employ means for removing the screen 37 to facilitate cleaning out the fuel supply conduit 35. Such means may take the form of a rod 40 attached to the screen 37 and extending to an opening 41 in the conduit, said opening being closed by a screw plug 43. The rod may or may not be attached to the plug; in the latter event, it may be grasped by the fingers for removal.

It will be seen that the device described above is extremely economical in construction and assembly, the bowls 10 and 17 being capable of manufacture in one piece as by a stamping or spinning operation, while the rings 26 and 32 may be readily cast or stamped. By providing a loose cast ring 32 at the point of highest temperature in the burner I eliminate the possibility of warping and thus eliminate the possibility of faulty operation which would result from such warpage. I have found that a stamped ring of this shape will also satisfactorily resist warpage.

It will readily be seen that in the operation of my device, some primary air is introduced into the fuel stream through the aperture 36, furnishing all primary air for the pilot flame and a portion of the primary air when a heating flame is produced; under the latter conditions primary air is also introduced through the lower holes 15, while secondary air is introduced not only through the upper apertures 15 but also through the annular air gap 28, the air thus introduced being guided downwardly and inwardly by the flange 33 of the ring 32 and into intimate contact with the gasified fuel. It will be noted, upon referring to Figure 2 of the drawing, that the annular wall 20 forms a baffle extending upwardly from a point adjacent the bottom of the inner bowl 10 to a sufficient height to baffle substantially all of the lower apertures 15, or in other words, substantially all of the apertures supplying air to the primary combustion zone.

I have found that many advantages accrue from use of the outer bowl 17 with its outwardly spaced wall 20. By this means I am able to position the air holes 15 very low in the bowl 10, whereby air may be introduced into the fuel as soon as the fuel vaporizes, and increasing the quantity of air which is possible to introduce. Let it be readily understood, of course, that should the fuel level rise above the lowermost holes 15, it will flow into the chamber 21 and do no damage. This arrangement permits a large capacity of fuel, increasing the heat production as compared to the size of the burner. Furthermore, the outer bowl 17 serves as an additional safeguard against any possible defect which might develop in the inner bowl as a result of use.

A further advantage of the outer bowl 17 is that the air which is forced through the chamber 21 is brought into intimate contact with the hot wall 12 of the inner bowl, and as a result of its being preheated, the efficiency of combustion is considerably enhanced.

Various modifications and changes coming within the spirit of my invention may suggest themselves to those skilled in the art and, hence, I do not wish to be limited to the specific form shown or uses mentioned, except to the extent indicated in the appended claims, which are to be interpreted as broadly as the state of the art will permit.

I claim:

1. In a pot burner, a liquid fuel supply conduit, said conduit having an aperture therein for admission of air into the fuel stream, a foraminous member in said conduit between its outlet and said aperture, means for removing said member including a plug removably secured to said conduit and a member connecting said foraminous member and said plug.

2. A pot type oil burner for burning oil with a minimum of natural draft, comprising a combustion bowl having a side wall provided with apertures for the passage of air to provide primary and secondary combustion zones, and an imperforate baffle member extending entirely about the circumference of the bowl, said baffle member having a portion extending outwardly from the side wall of the bowl at a point adjacent the bottom thereof and another portion extending upwardly, in spaced relation to the side wall of the bowl, a substantial distance above the lowest aperture and to a sufficient height to baffle substantially all of the apertures in the primary combustion zone and to leave unbaffled substantially all of the apertures in the secondary combustion zone, to thereby form an annular chamber entirely circumscribing the lower portion of the side of the bowl, open at the top for admission of air, and closed at the bottom, whereby substantially all of the primary air fed to said bowl will flow in a tortuous path to produce a uniform flow of primary air.

3. A pot type oil burner for burning oil with a minimum of natural draft, comprising a combustion bowl having a side wall provided with apertures for the passage of air to provide primary and secondary combustion zones, a second imperforate bowl positioned in nested relation relative to said first bowl and substantially co-extensive with the lower portion of said first bowl, said second bowl having a portion extending outwardly from the side wall of the first bowl at a point adjacent the bottom thereof entirely around the circumference of the first bowl, and another imperforate portion extending upwardly, in spaced relation to the side wall of the first bowl and entirely around the circumference thereof, a substantial distance above the lowest aperture and to a sufficient height to baffle substantially all of the apertures in the primary combustion zone and to leave unbaffled substantially all the apertures in the secondary combustion zone, to thereby form an annular chamber entirely circumscribing the side of the first bowl, open at the top for admission of air and closed at the bottom, whereby substantially all of the primary air fed to said bowl will flow in a tortuous path to produce a uniform flow of primary air, and a conduit for introducing fuel to said first bowl.

4. A pot type oil burner for burning oil with a minimum of natural draft, comprising a combustion bowl having a side wall provided with apertures for the passage of air to provide primary and secondary combustion zones, an imperforate baffle member extending entirely about the circumference of the bowl, said baffle member having a portion extending outwardly from the side wall of the bowl at a point adjacent the bottom thereof and another portion extending upwardly, in spaced relation to the side wall of the bowl, a substantial distance above the lowest aperture and to a sufficient height to baffle substantially all of the apertures in the primary combustion zone and to leave unbaffled substantially all the apertures in the secondary combustion zone, to thereby form an annular chamber entirely circumscribing the side of the bowl, open at the top for admission of air, and closed at the bottom, whereby substantially all of the primary air fed to said bowl will flow in a tortuous path to produce a uniform flow of primary air, and an annular plate spaced above the upper edge of said combustion bowl and extending a substantial distance inwardly and downwardly from the edge of said bowl, for directing secondary air toward the center of said bowl and for maintaining a concentrated flame.

5. A pot type oil burner for burning oil with a minimum of natural draft, comprising a combustion bowl having a side wall apertured for the passage of air to provide primary and secondary combustion zones, an imperforate baffle member extending entirely about the circumference of the bowl, said baffle member having a portion extending outwardly from the side wall of the bowl at a point adjacent the bottom thereof and another portion extending upwardly in spaced relation to the side wall of the bowl to substantially a point above the mid section of said bowl to thereby baffle substantially all of the apertures in the primary combustion zone and to leave unbaffled substantially all the apertures in the secondary combustion zone, and form an annular chamber entirely circumscribing the side of the bowl, open at the top for admission of air, and closed at the bottom, whereby substantially all of the primary air fed to said bowl will flow in a tortuous path to produce a uniform flow of primary air.

WILLIAM O. HORNE.